(12) United States Patent
Chinniah et al.

(10) Patent No.: US 7,401,948 B2
(45) Date of Patent: Jul. 22, 2008

(54) NEAR FIELD LENS HAVING REDUCED SIZE

(75) Inventors: Jeyachandrabose Chinniah, Canton, MI (US); Amir P. Fallahi, W. Bloomfield, MI (US); Jeffrey Allen Erion, Plymouth, MI (US); Edwin Mitchell Sayers, Saline, MI (US); Thomas Lee Jones, Commerce Township, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 91 days.

(21) Appl. No.: 11/252,008

(22) Filed: Oct. 17, 2005

(65) Prior Publication Data

US 2007/0086204 A1    Apr. 19, 2007

(51) Int. Cl.
*F21V 8/00*    (2006.01)
(52) U.S. Cl. .................. 362/326; 362/310; 362/800; 362/340; 362/338
(58) Field of Classification Search ............... 362/800, 362/317, 326, 327, 331–336, 340, 338, 310, 362/268, 297
See application file for complete search history.

(56) References Cited

U.S. PATENT DOCUMENTS

| | | |
|---|---|---|
| 2,215,900 A | 9/1940 | Bitner |
| 2,224,178 A | 12/1940 | Bitner |
| 2,254,961 A | 9/1941 | Harris |
| 2,254,962 A | 9/1941 | Harris et al. |
| 2,387,816 A | 10/1945 | Wagner |
| 3,593,014 A | 7/1971 | Vesely |
| 3,700,883 A | 10/1972 | Donohue et al. |
| 4,344,110 A | 8/1982 | Ruediger |
| 4,389,698 A | 6/1983 | Cibie |
| 4,577,260 A | 3/1986 | Tysoe |
| 4,613,927 A | 9/1986 | Brandt |
| 4,642,740 A | 2/1987 | True |
| 4,704,661 A | 11/1987 | Kosmatka |
| 4,753,520 A | 6/1988 | Silverglate |
| 4,770,514 A | 9/1988 | Silverglate |
| 4,826,273 A | 5/1989 | Tinder et al. |
| 4,927,248 A | 5/1990 | Sakakibara et al. |
| 4,958,263 A | 9/1990 | Davenport et al. |

(Continued)

FOREIGN PATENT DOCUMENTS

DE    3317519 A1    11/1948

(Continued)

OTHER PUBLICATIONS

JP02001257381—English Abstract—Published Sep. 21, 2001.

(Continued)

*Primary Examiner*—Anabel M Ton
(74) *Attorney, Agent, or Firm*—Brinks Hofer Gilson & Lione

(57) ABSTRACT

A near field lens for an automotive light assembly which has a reduced thickness. Generally, the near field lens includes a main body of light transmitting material. A pocket is formed in the main body for receiving light from a light source. The pocket is defined by an inner radially facing surface and an inner axially facing surface. The inner radially facing surface is structured to reduce the thickness of the lens.

22 Claims, 3 Drawing Sheets

U.S. PATENT DOCUMENTS

| | | | |
|---|---|---|---|
| 4,972,302 | A | 11/1990 | Masuyama et al. |
| 5,042,928 | A | 8/1991 | Richards |
| 5,081,564 | A | 1/1992 | Mizoguchi et al. |
| 5,161,059 | A | 11/1992 | Swanson et al. |
| 5,184,883 | A | 2/1993 | Finch et al. |
| 5,276,594 | A | 1/1994 | Burkett et al. |
| 5,311,410 | A | 5/1994 | Hsu et al. |
| 5,343,330 | A | 8/1994 | Hoffman et al. |
| 5,369,554 | A | 11/1994 | Erion |
| 5,434,756 | A | 7/1995 | Hsu et al. |
| 5,440,456 | A | 8/1995 | Bertling et al. |
| 5,485,317 | A | 1/1996 | Perissinotto et al. |
| 5,526,190 | A | 6/1996 | Hubble, III et al. |
| 5,532,909 | A | 7/1996 | Ban et al. |
| 5,567,031 | A | 10/1996 | Davenport et al. |
| 5,577,492 | A | 11/1996 | Parkyn, Jr. et al. |
| 5,608,290 | A | 3/1997 | Hutchisson et al. |
| 5,642,933 | A | 7/1997 | Hitora |
| 5,757,557 | A | 5/1998 | Medvedev et al. |
| 5,775,792 | A | 7/1998 | Wiese |
| 5,803,575 | A | 9/1998 | Ansems et al. |
| 5,813,743 | A | 9/1998 | Naka |
| 5,894,195 | A * | 4/1999 | McDermott ............... 313/512 |
| 5,894,196 | A * | 4/1999 | McDermott ............... 313/512 |
| 5,898,267 | A | 4/1999 | McDermott |
| 5,914,760 | A | 6/1999 | Dalku |
| 5,926,320 | A | 7/1999 | Parkyn, Jr. et al. |
| 5,931,576 | A | 8/1999 | Kreysar et al. |
| 5,947,587 | A | 9/1999 | Keuper et al. |
| 6,007,226 | A | 12/1999 | Howard |
| 6,019,493 | A | 2/2000 | Kuo et al. |
| 6,075,652 | A | 6/2000 | Ono et al. |
| 6,097,549 | A | 8/2000 | Jenkins et al. |
| 6,106,128 | A | 8/2000 | Zou et al. |
| 6,123,440 | A | 9/2000 | Albou |
| 6,129,447 | A | 10/2000 | Futami |
| 6,139,147 | A | 10/2000 | Zhang |
| 6,152,588 | A | 11/2000 | Scifres |
| 6,164,799 | A | 12/2000 | Hirmer et al. |
| 6,168,302 | B1 | 1/2001 | Hulse |
| 6,191,889 | B1 | 2/2001 | Maruyama |
| 6,206,554 | B1 | 3/2001 | Schuster et al. |
| 6,283,623 | B1 | 9/2001 | Chinniah et al. |
| 6,292,293 | B1 | 9/2001 | Chipper |
| 6,296,376 | B1 * | 10/2001 | Kondo et al. ............... 362/310 |
| 6,305,830 | B1 | 10/2001 | Zwick et al. |
| 6,327,086 | B1 | 12/2001 | Unno |
| 6,334,702 | B1 | 1/2002 | Albou |
| 6,352,359 | B1 | 3/2002 | Shie et al. |
| 6,356,394 | B1 | 3/2002 | Glienicke |
| 6,367,950 | B1 | 4/2002 | Yamada et al. |
| 6,367,954 | B1 | 4/2002 | Futami |
| 6,367,957 | B1 | 4/2002 | Hering et al. |
| 6,402,355 | B1 | 6/2002 | Kinouchi |
| 6,431,738 | B1 | 8/2002 | Kondo et al. |
| 6,447,155 | B2 | 9/2002 | Kondo et al. |
| 6,454,443 | B2 | 9/2002 | Natsume et al. |
| 6,462,874 | B1 | 10/2002 | Soskind |
| 6,481,864 | B2 | 11/2002 | Hosseini et al. |
| 6,527,411 | B1 | 3/2003 | Sayers |
| 6,536,918 | B1 | 3/2003 | Boroczki et al. |
| 6,536,921 | B1 | 3/2003 | Simon |
| 6,536,923 | B1 * | 3/2003 | Merz ..................... 362/327 |
| 6,543,923 | B2 | 4/2003 | Tamai |
| 6,547,423 | B2 | 4/2003 | Marshall et al. |
| 6,560,038 | B1 | 5/2003 | Parkyn, Jr. et al. |
| 6,604,843 | B2 | 8/2003 | Shpizel |
| 6,616,299 | B2 | 9/2003 | Martineau |
| 6,616,305 | B1 | 9/2003 | Simon |
| 6,623,132 | B2 | 9/2003 | Lekson et al. |
| 6,626,565 | B2 | 9/2003 | Ishida |
| 6,679,618 | B1 | 1/2004 | Suckow et al. |
| 6,698,908 | B2 | 3/2004 | Sitzema, Jr. et al. |
| 6,724,543 | B1 | 4/2004 | Chinniah et al. |
| 6,726,346 | B2 | 4/2004 | Shoji |
| 6,755,556 | B2 | 6/2004 | Gasquet et al. |
| 6,757,109 | B2 | 6/2004 | Bos |
| 6,783,269 | B2 | 8/2004 | Pashley et al. |
| 6,805,456 | B2 | 10/2004 | Okuwaki |
| 6,807,019 | B2 | 10/2004 | Takeuchi et al. |
| 6,814,475 | B2 | 11/2004 | Amano |
| 6,814,480 | B2 | 11/2004 | Amano |
| 6,819,505 | B1 | 11/2004 | Cassarly et al. |
| 6,819,506 | B1 | 11/2004 | Taylor et al. |
| 6,824,284 | B2 | 11/2004 | Chinniah et al. |
| 6,899,443 | B2 | 5/2005 | Rizkin et al. |
| 6,910,783 | B2 | 6/2005 | Mezei et al. |
| 2002/0008969 | A1 | 1/2002 | Mabuchi et al. |
| 2002/0080615 | A1 | 6/2002 | Marshall et al. |
| 2002/0093820 | A1 | 7/2002 | Pederson |
| 2002/0126400 | A1 | 9/2002 | Muller-Rissmann et al. |
| 2002/0136022 | A1 | 9/2002 | Nakata |
| 2002/0167820 | A1 | 11/2002 | Haering et al. |
| 2002/0172052 | A1 | 11/2002 | Perlo et al. |
| 2003/0007359 | A1 | 1/2003 | Sugawara et al. |
| 2003/0067784 | A1 | 4/2003 | Erber |
| 2003/0075167 | A1 | 4/2003 | Minano Dominguez et al. |
| 2003/0099113 | A1 | 5/2003 | Gebauer et al. |
| 2003/0123159 | A1 | 7/2003 | Morita et al. |
| 2003/0123262 | A1 | 7/2003 | Suehiro et al. |
| 2003/0218882 | A1 | 11/2003 | Wirth et al. |
| 2003/0235046 | A1 | 12/2003 | Chinniah et al. |
| 2003/0235050 | A1 | 12/2003 | West et al. |
| 2004/0012976 | A1 | 1/2004 | Amano |
| 2004/0070855 | A1 | 4/2004 | Benitez et al. |
| 2004/0109326 | A1 | 6/2004 | Uhl |
| 2004/0114393 | A1 | 6/2004 | Galli |
| 2004/0120157 | A1 | 6/2004 | Bottesch et al. |
| 2004/0130904 | A1 | 7/2004 | Yamada et al. |
| 2004/0141323 | A1 | 7/2004 | Aynie et al. |
| 2004/0145899 | A1 | 7/2004 | Riebling et al. |
| 2004/0150991 | A1 | 8/2004 | Ouderkirk et al. |
| 2004/0179349 | A1 | 9/2004 | Buelow, II et al. |
| 2004/0202003 | A1 | 10/2004 | Lyst, Jr. |
| 2004/0212998 | A1 | 10/2004 | Mohacsi |
| 2004/0218392 | A1 | 11/2004 | Leadford |
| 2004/0257827 | A1 | 12/2004 | Ishida et al. |
| 2004/0264199 | A1 | 12/2004 | Shu et al. |
| 2005/0007753 | A1 | 1/2005 | Van Hees et al. |
| 2005/0024744 | A1 | 2/2005 | Fallcoff et al. |
| 2005/0057938 | A1 | 3/2005 | Mertens et al. |
| 2005/0078483 | A1 | 4/2005 | Bernard et al. |
| 2005/0083699 | A1 | 4/2005 | Rhoades et al. |

FOREIGN PATENT DOCUMENTS

| | | |
|---|---|---|
| DE | 20206829 U1 | 10/2002 |
| DE | 10329185 A1 | 1/2005 |
| EP | WO 89/08223 | 8/1989 |
| JP | 05205511 | 8/1993 |
| JP | 06260006 | 9/1994 |
| JP | 02001257381 | 9/2001 |

OTHER PUBLICATIONS

Product Brochure—The LED Light.com; Luxeon LEDs, Assemblies, and Accessories; pp. 1-4, Jul. 27, 2005.
Product Brochure—Carcio Precision Optics; LED Optics; 2 Pages.
DE 3317519 A1—English Abstract—Published Nov. 15, 1948.
JP05205511—English Abstract—Published Aug. 13, 1993.
JP06260006—English Abstract—Published Sep. 16, 1994.
WO 89/08223—English Abstract—Published Aug. 9, 1989.

* cited by examiner

NEAR FIELD LENS HAVING REDUCED SIZE

FIELD OF THE INVENTION

The present invention relates generally to automotive light modules having near field lenses collecting and directing light from sources such as light emitting diodes.

BACKGROUND OF THE INVENTION

Light emitting diodes (LED's) are fast becoming the preferable light source for automotive lighting applications, as they consume less power but provide light output which is acceptable for such applications. Near field lenses (NFL's) are used to collect as well as to collimate the light from a LED source, and generally provide high light collection efficiency (typically 70-90%), but the output beam size for a given source depends on the size of the lens. The larger the lens size (i.e. the larger the starting focal length of the lens), the smaller of the output beam size and the higher the peak intensity. However, manufacturing larger lenses poses complex molding issues and takes higher molding cycle time, thus requiring expensive molding tools and processes.

Accordingly, there exists a need to provide a lighting assembly having a lens that provides the output beam size and peak intensity for automotive applications, while reducing the size of the NFL.

BRIEF SUMMARY OF THE INVENTION

The present invention provides a near field lens which reduces the size of the near field lens. Generally, the near field lens includes a main body of light transmitting material. A pocket is formed in the main body for receiving light from a light source. The pocket is defined by an inner radially facing surface and an inner axially facing surface. The inner radially facing surface is curved and follows a circular arc.

According to more detailed aspects, the inner radially facing surface is curved between an upstream point and a downstream point, wherein a tangent of the curve at the downstream point is generally parallel to the longitudinal axis. The radius of the circular arc is greater than or equal to half the radial height of the main body. Preferably, the entire radially facing surface is curved. The inner axially facing surface is also preferably curved, and has a slop of curvature that is greater than a slop of curvature of the inner radially facing surface. An outer axially facing surface of the main body may be perpendicular to the longitudinal axis, may have a slanted portion that is angled relative to the longitudinal axis, or may include a plurality of beam spreading pillows.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
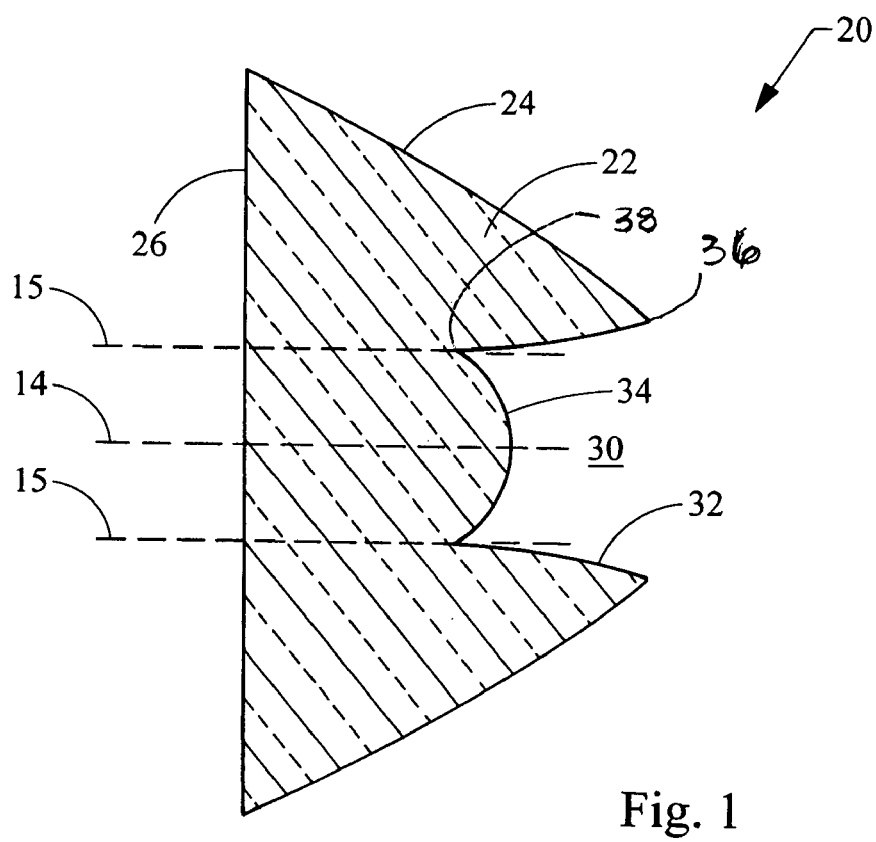
FIG. 1 is a cross-section view of a near field lens constructed in accordance with the teachings of the present invention.
Figure 2:
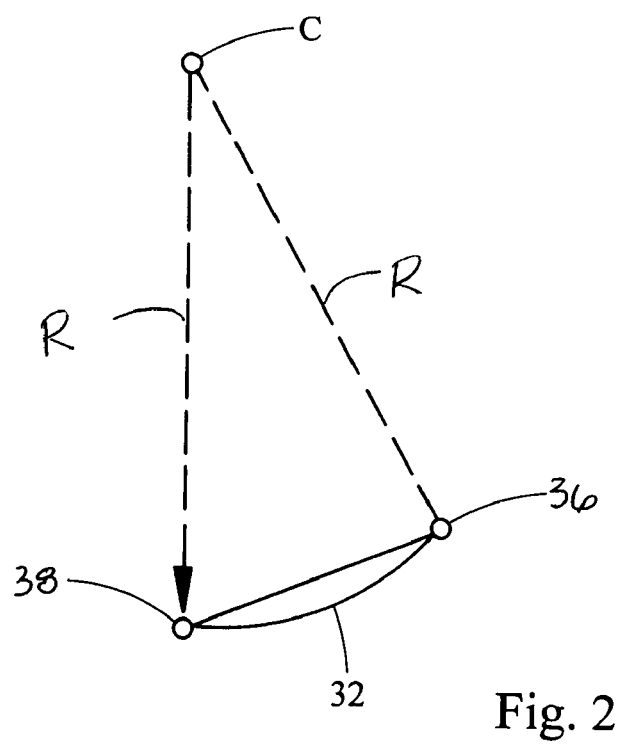
FIG. 2 is another cross-sectional view of the near field lens depicted in FIG. 1.
Figure 3:
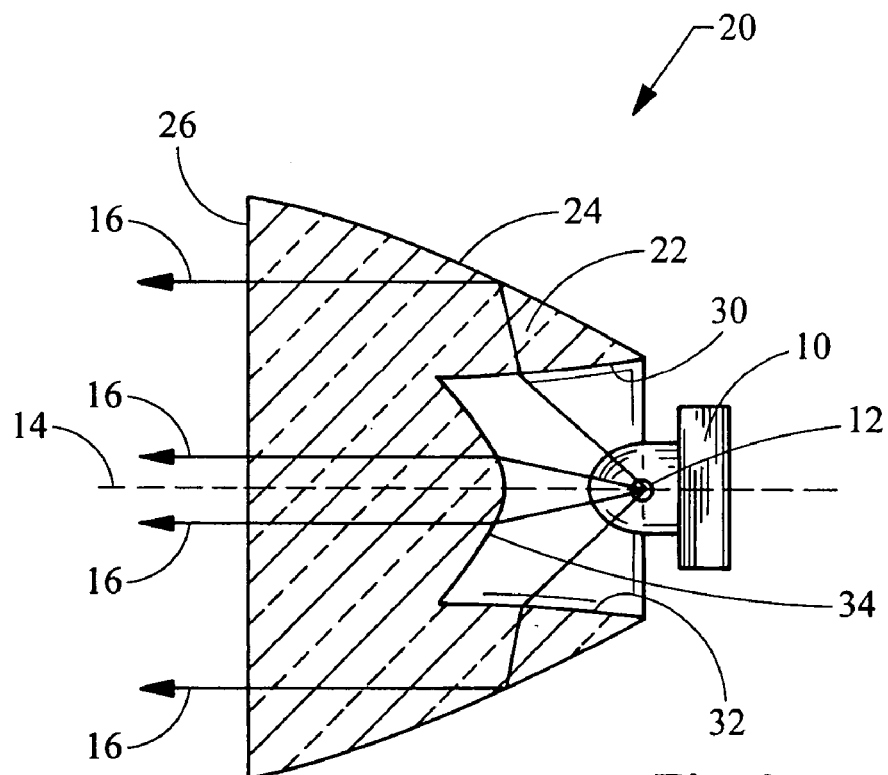
FIG. 3 is a cross-sectional view of an alternate embodiment of the near field lens depicted in FIG. 1.

Turning now to the figures, FIGS. 1 to 3 depict a near field lens 20 for an automotive lighting assembly having a light source 10. Preferably the light source 10 is a light emitting diode (LED) generating light from a source point 12. The NFL 20 generally defines a longitudinal axis 14 along which the NFL 20 collects, collimates and redirects the light 16 downstream from the light source 10.

The NFL 20 generally comprises a main body 22 having an outer radially facing surface 24 and an outer axially facing surface 26. The main body 22 is made of a light transmitting material, and preferably an optical grade plastic. The main body 22 defines a pocket 30 which receives the LED 10, or at least the light 16 from the LED 10. The pocket 30 is generally defined by an inner radially facing surface 32 and an inner axially facing surface 34. The inner axially facing surface 34 is curved, and more particularly is structured as a lens in order to axially collimate the light 16. As best seen in FIG. 3, light 16 in the pocket 30 passes through the inner axially facing surface 34 is collimated and refracted downstream along the longitudinal axis 14, passing through the outer axially facing surface 26.

Light 16 in the pocket 30 also passes through the inner radially facing surface 32, which refracts the light 16 towards the outer radially facing surface 24. The outer radially facing surface 24 is curved, and is preferably a numerically-generated curve based on the structure of the inner radially facing surface 32. As such, the outer radially facing surface 24 is structured to collimate the light 16 axially and redirect the light longitudinally downstream through the principles of total internal reflection (TIR). In sum, a portion of the light 16 in the pocket 30 is refracted by the inner radially facing surface 32, reflected and collimated by the outer radially facing surface 24, and passes through the outer axially facing surface 26 as it moves downstream.

The present invention provides an NFL 20 which has a reduced thickness (measured in the longitudinal direction along axis 14) through the unique structure of the pocket 30. Specifically, the inner radially facing surface 32 is curved in a manner that permits reduction in the thickness. The surface 32 is curved between an upstream point 36 and a downstream point 38, and in the depicted embodiment is curved over its entire surface. Further, a tangent 15 to the curvature of the inner radially facing surface 32, taken at the downstream point 38, runs generally parallel to the longitudinal axis 14. By the term generally, it is meant that the tangent 15 and axis 14 are parallel within 1 degree of each other.

As best seen in FIG. 2, it is preferable that the inner radially facing surface 32 follows a circular arc. The downstream point 38 is the radially inner most point of the radially facing surface 32. Most preferably, the radius R of the circular arc of surface 32 is greater than or equal to the radius of the main body 22 taken at the outer axially facing surface 26 (or in cases where the main body does not have a cylindrical cross-section, half a radial height of the main body 22). It can also be seen that the slope of curvature of the inner axially facing surface 34 is greater than the slope of the curvature of the inner radially facing surface 32.

Accordingly, it will be understood by those skilled that through the special structure of the pocket 30, and in particular the inner radially facing surface 32, the NFL 20 has a reduced axial thickness while providing a suitable beam pattern when compared to a straight wall configuration for the surface 32. Further, the axial thickness of the NFL 20 may be reduced without an increase in the radial height of the NFL 20. This reduces the amount of material needed to form the main body 22, decreases manufacturing time and eliminates expensive molding tools and processes, while providing an output beam size in peak intensity suitable for automotive applications. Generally, the main body 22 has a ratio of thickness to height (measured from the extreme ends) that is less than 0.60, and most preferably less than 0.55.

Figure 4:
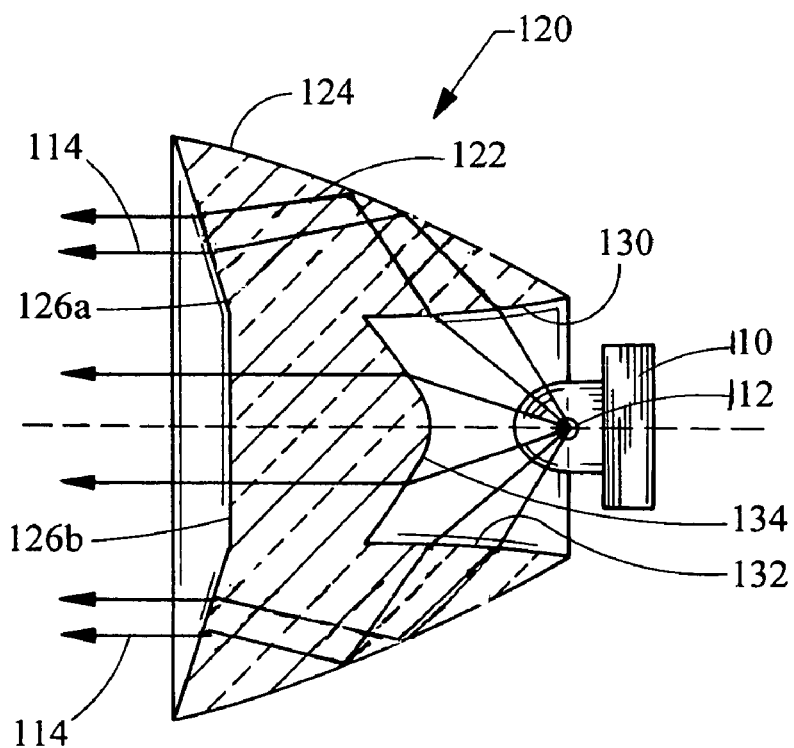
FIG. 4 is a cross-sectional view of another alternate embodiment of the near field lens depicted in FIG. 1.

An alternate embodiment of the NFL 120 is depicted in FIG. 4. A main body 122 includes an outer radially facing surface 124 and an outer axially facing surface, which here has been depicted as a slanted surface comprising an outer portion 126a and an inner portion 126b. The inner portion 126b is generally perpendicular to the longitudinal axis 114 while the outer portion 126a is angled relative to the axis 114. A pocket 130 is defined by an inner radially facing surface 132 and an inner axially facing surface 134, constructed in accordance with the teachings above. Light 116 from a light source 110 is emitted in the pocket and is either collimated by the inner axially facing surface 134 or refracted by the inner radially facing surface 132.

Unlike the prior embodiment, the light 116 is reflected by the outer axially facing surface 124 in an imperfect collimating fashion, such that the light 116 is redirected radially inwardly towards the slanted outer surface 126a, which in turn directs the light longitudinally downstream. Accordingly, it will be recognized by those skilled in the art that the unique outer axially facing surface defined by slanted portion 126a and inner portion 126b results in an NFL 120 having a reduced radial height and a well focused and collimated beam pattern.

Figure 5:
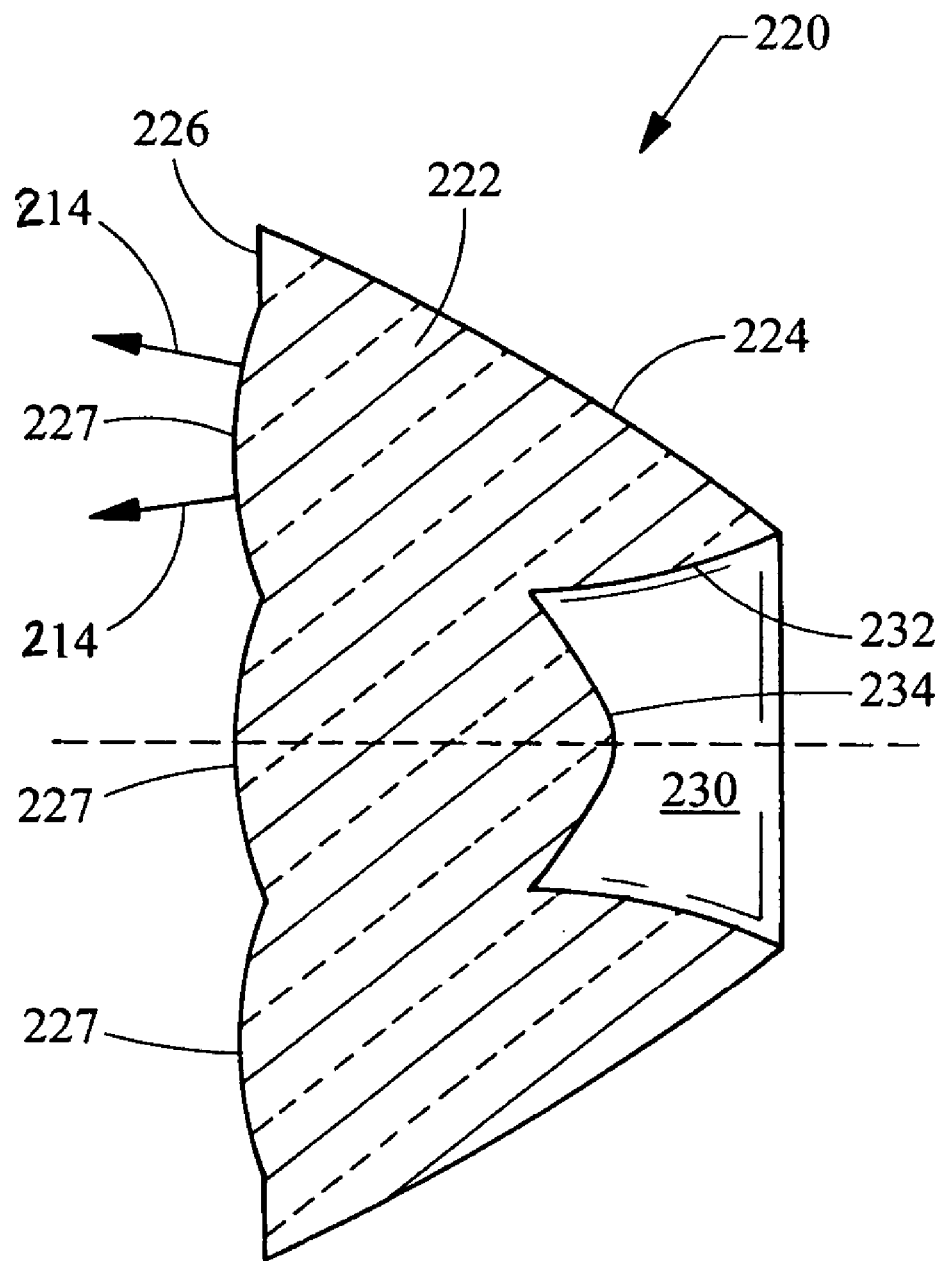
FIG. 5 is a cross-sectional view of yet another alternate embodiment of the near field lens depicted in FIG. 1.

Turning to FIG. 5, yet another alternate embodiment of the NFL 220 is depicted in accordance with the teachings of the present invention. The NFL 220 includes a main body 222 having an outer radially facing surface 224 and an outer axially facing surface 226. The main body 222 includes a pocket 230 defined by an inner radially facing surface 232 and an inner axially facing surface 234 which are constructed in accordance with the teachings above. In this embodiment, the outer axially facing surface 226 includes a plurality of beam spreading optics, namely a number of circular, rectangular or other arbitrarily shaped pillows 227 which result in a refraction of the light 216 emitted from the NFL 220.

It will be recognized by those skilled in the art that through the unique construction of the near field lens as described above, the size of the NFL can be significantly reduced in the longitudinal (axial) direction without increasing the radial height or diameter of the NFL. At the same time, a beam pattern having the size and intensity desired and required for automotive applications is provided. By way of this structure, numerous benefits in cost, weight and manufacturing are achieved.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A near field lens for an automotive light assembly having a light source, the lens directing light outwardly along a longitudinal axis, the lens comprising:
   a main body of light transmitting material;
   a pocket formed in the main body for receiving light from the light source, the pocket being defined by an inner radially facing surface and an inner axially facing surface;
   the inner radially facing surface being curved and following a circular arc.

2. The near field lens of claim 1, wherein the inner radially facing surface is curved between an upstream point and a downstream point, and wherein a tangent of the curve at the downstream point is generally parallel to the longitudinal axis.

3. The near field lens of claim 1, wherein the entire inner radially facing surface is curved.

4. The near field lens of claim 1, wherein the radius of the circular arc is greater than or equal to half of a radial height of the main body.

5. The near field lens of claim 1, wherein the inner axially facing surface is curved, a slope of the curvature of the inner axially facing surface being greater than a slope of the curvature of the inner radially facing surface.

6. The near field lens of claim 1, wherein the inner axially facing surface is structured as a lens to focus light from the pocket downstream.

7. The near field lens of claim 1, wherein the main body has a ratio of thickness to height less than 0.60.

8. The near field lens of claim 1, wherein the main body has a ratio of thickness to height less than 0.55.

9. The near field lens of claim 1, wherein the main body includes an outer radially facing surface structured to collimate and redirect light longitudinally.

10. The near field lens of claim 9, wherein the inner radially facing surface refracts light from the pocket, the light in turn reflected by the outer radially facing surface.

11. The near field lens of claim 9, wherein the outer radially facing surface follows a numerically generated curve.

12. A near field lens for an automotive light assembly having a light source, the lens directing light outwardly along a longitudinal axis, the lens comprising:
   a main body of optical transmitting material;
   a pocket formed in the main body for receiving light from the light source, the pocket being defined by an inner radially facing surface and an inner axially surface;
   the inner radially facing surface having a single curvature and being curved between an upstream point and a downstream point, a tangent of the curve at the downstream point being generally parallel to the longitudinal axis.

13. The near field lens of claim 12, wherein the inner radially facing surface follows a circular arc.

14. The near field lens of claim 12, wherein the entire inner radially facing surface is curved.

15. The near field lens of claim 12, wherein the inner axially facing surface is curved, a slope of the curvature of the inner axially facing surface being greater than a slope of the curvature of the inner radially facing surface.

16. The near field lens of claim 12, wherein the main body has a ratio of thickness to height less than 0.60.

17. The near field lens of claim 12, wherein the main body has a ratio of thickness to height less than 0.55.

18. The near field lens of claim 12, wherein the main body includes an outer axially facing surface that is flat and generally perpendicular to the longitudinal axis.

19. The near field lens of claim 12, wherein the main body includes an outer axially facing surface having a slanted portion that is angled relative to the longitudinal axis.

20. The near field lens of claim 12, wherein the main body includes an outer axially facing surface having a plurality of beam spreading pillows.

21. The near field lens of claim 12, wherein the downstream point is the radially innermost point of the inner radially facing surface.

22. The near field lens of claim 12, wherein the main body includes an outer radially facing surface having a single curvature to collimate end redirect the light longitudinally.

* * * * *